Figure 1:
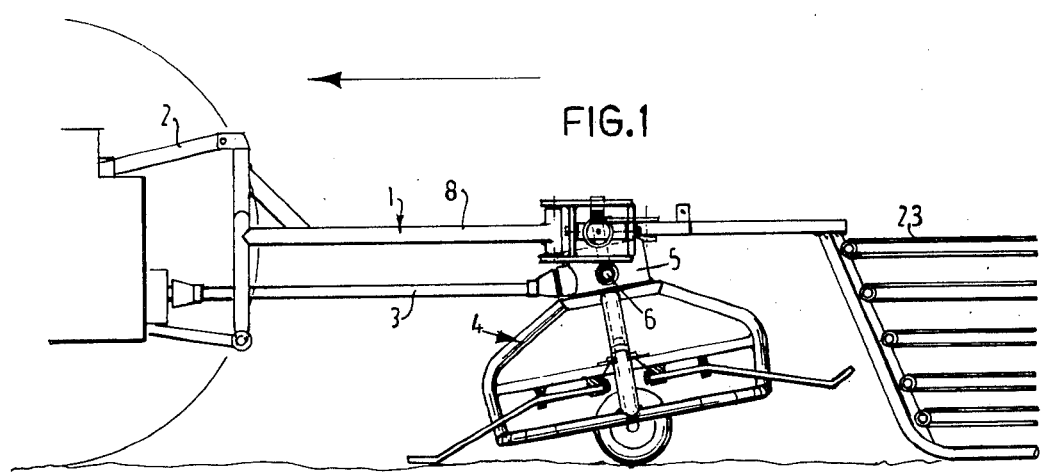

United States Patent [19]

van der Plas et al.

[11] 4,015,413
[45] Apr. 5, 1977

[54] AGRICULTURAL IMPLEMENT FOR RAKING OR SPREADING CROP LYING ON THE GROUND HAVING AN IMPROVED FRAME

[76] Inventors: Nicolaas van der Plas, 152, Savelstraat, Sterrebeek, Belgium; Berend Broijl, 26, Prinses Irenestraat, Kleotinge, Netherlands

[22] Filed: Aug. 19, 1975

[21] Appl. No.: 605,802

[30] Foreign Application Priority Data

Aug. 20, 1974 Netherlands ............... 7411126

[52] U.S. Cl. .................... 56/370; 56/DIG. 14
[51] Int. Cl.² ........................ A01D 79/00
[58] Field of Search ........... 56/370, 377, 365, 368, 56/192, DIG. 14

[56] References Cited

UNITED STATES PATENTS

| | | | |
|---|---|---|---|
| 2,147,183 | 2/1939 | Zimbalist | 254/192 |
| 2,923,118 | 2/1960 | van der Lely et al. | 56/370 X |
| 3,059,403 | 10/1962 | Bamford et al. | 56/192 X |
| 3,559,389 | 2/1971 | van der Lely et al. | 56/370 |
| 3,841,073 | 10/1974 | van der Lely | 56/370 |
| 3,890,769 | 6/1975 | van der Lely | 56/370 |

FOREIGN PATENTS OR APPLICATIONS

| | | | |
|---|---|---|---|
| 2,032,043 | 1/1971 | Germany | 56/370 |
| 2,160,771 | 6/1972 | Germany | 56/370 |

*Primary Examiner*—J. N. Eskovitz
*Attorney, Agent, or Firm*—Snyder, Brown & Ramik

[57] ABSTRACT

The invention relates to an agricultural implement for raking or spreading crop lying on the ground comprising a frame attached to the three-point lift of a tractor and at least one pair of rake wheels suspended to said frame and driven by the power take-off shaft of the tractor; the improvement concerns the frame comprising a longitudinal beam coupled with the tractor and extending in the direction of movement and a transverse beam pivoted to the former, the pivot having a vertical hinge pin as well as a hinge pin extending in the length direction, and an adjustable coupling member being arranged between the longitudinal and transverse beams for the adjustment of the angle formed by the beams.

17 Claims, 7 Drawing Figures

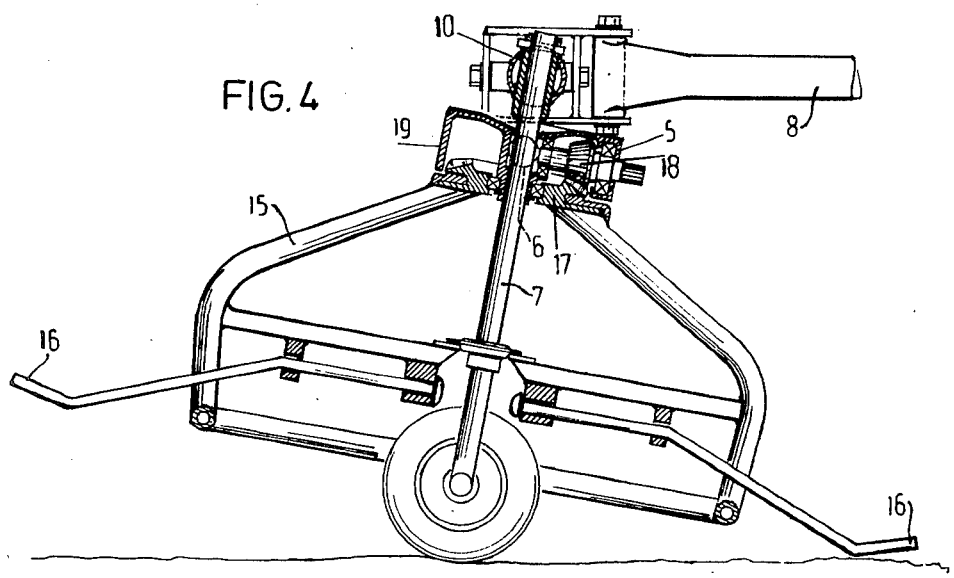
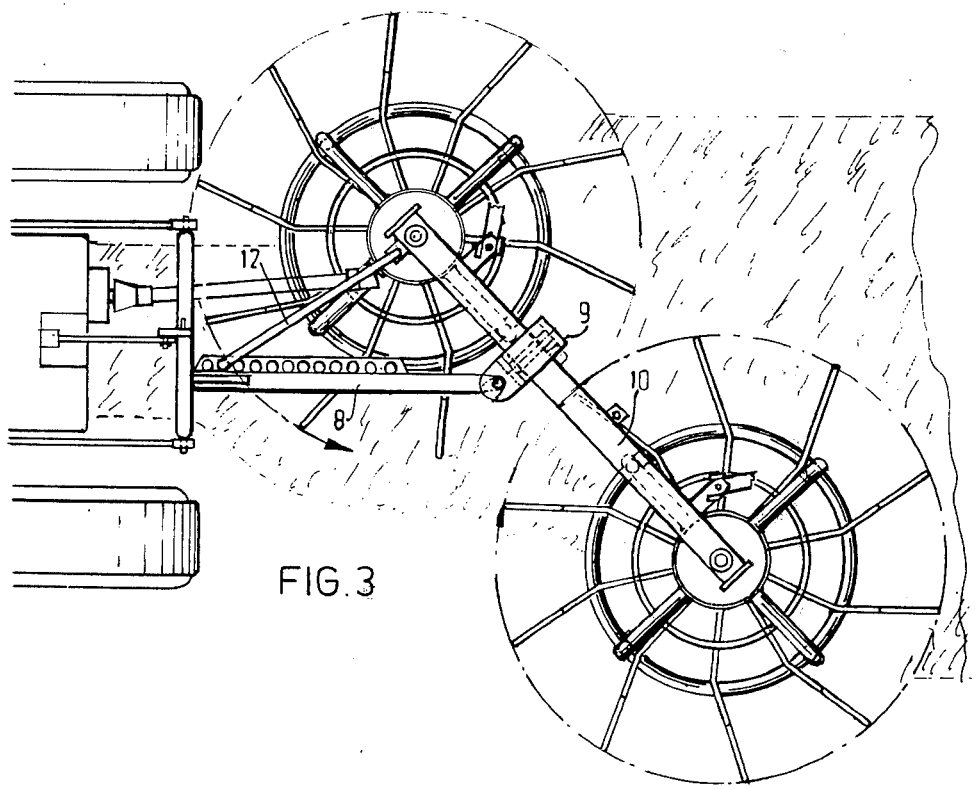

AGRICULTURAL IMPLEMENT FOR RAKING OR SPREADING CROP LYING ON THE GROUND HAVING AN IMPROVED FRAME

The invention relates to an agricultural implement for raking or spreading crop lying on the ground comprising a frame attached to the three-point lift of a tractor and at least one pair or rake wheels suspended to said frame and driven by the power take-off shaft of the tractor.

The invention has for its object to improve the frame of such an agricultural implement to an extent such that the rake wheels operate to the optimum both in the raking position and in the spreading position.

To this end the invention provides an agricultural implement comprising a longitudinal beam coupled with the tractor and extending in the direction of movement and a transverse beam pivoted to the former, the pivot having a vertical hinge pin and an adjustable coupling member being arranged between the longitudinal and transverse beams for the adjustment of the angle between said two beams.

When the angle between the two beams is about 90°, the rake wheels occupy the raking position, that is to say, the crop spread on the field is raked and assembled in a swath. If on the contrary the transverse beam is adjusted at an angle differing from 90° to the longitudinal beam, the rake members are in the spreading position, which means that the crop collected in a swath is again spread across the field, in which case the foremost rake wheels picks up the crop from the swath and transfers the same to the hindmost rake wheel, which throws the crop upwards.

In order to ensure optimum matching of the unevennesses of the ground the hinge between the two beams is furthermore provided with a hinge pin extending in the direction of length.

In order to facilitate the displacement of the frame to the two aforesaid working positions behind the tractor with respect to the vertical plane, the topmost coupling point of the threepoint suspension for the frame is formed by two horizontally spaced stubs. For each working position one of the two stubs engages the topmost coupling point of the tractor.

When each rake wheel is rotatably driven about an upright shaft through a gear box, the upright shaft is passed, in accordance with the invention, through said gear box and directly fastened by its top and to the frame. The advantage thereof is that the forces exerted on the rake wheels are directly transferred by the upright shafts to the frame in contrast to the prior-art devices in which the shaft terminates in the housing of the gear box. This means that the housing itself is heavily loaded, which annuls the accurate tolerances for the operative gear wheels so that the lifetime of such a device is considerably reduced.

It is common practice to provide such an agricultural implement behind the rake members with a pair of swath boards adapted to turn towards and away from one another and being operative in the raking position; in the tedding position they have, however, to be removed so that they do not hinder a satisfactory operation of the device.

The invention proposes to provide the bar-shaped support, by means of which the swath boards are hinged to the frame, with a hinge, the pivot pin of which is located above the bar-shaped support. In this manner the support can be folded through 180° so that the swath board can be deposited on the frame.

Figure 5:
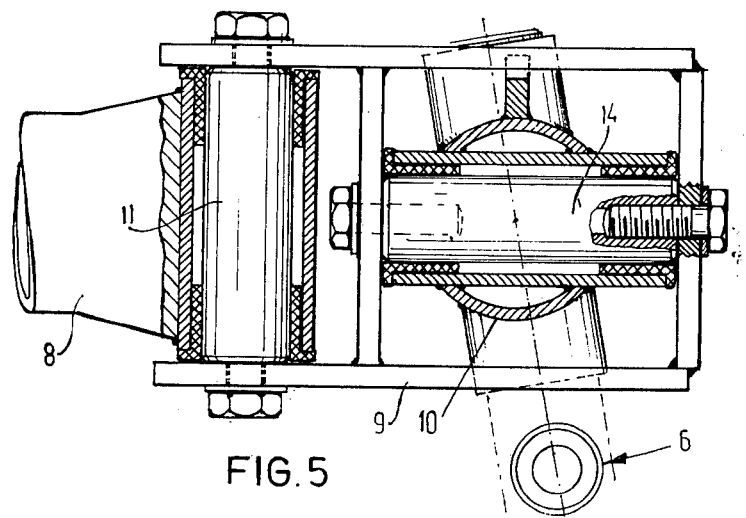
Figure 6:
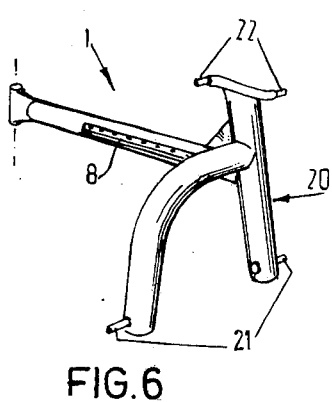
Figure 7:
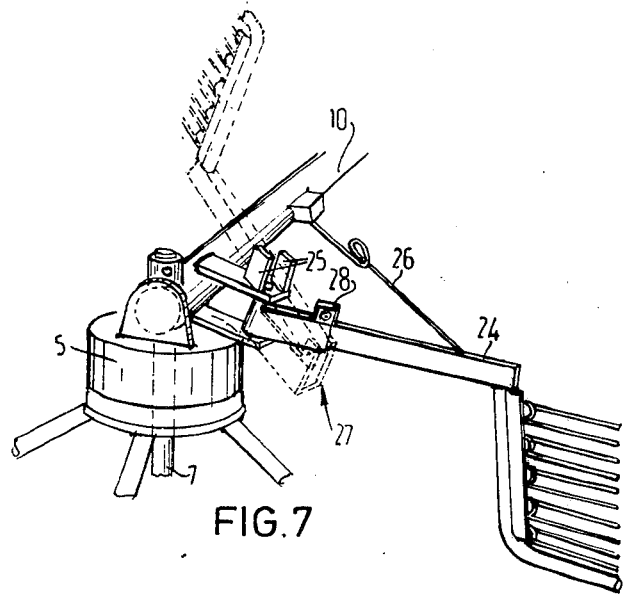

By using stop members on the frame the swath boards can be locked in the titled position, which will be apparent from the following description of a preferred embodiment. This preferred embodiment is illustrated in the accompanying drawing, in which FIG. 1 is a side elevation of the agricultural implement in accordance with the invention attached to an agricultural tractor and FIG. 2 is a plan view of the agricultural implement of FIG. 1 in one working position, FIG. 3 is a plan view like FIG. 2 of the agricultural implement in the other working position, FIG. 4 is a side elevation on an enlarged scale and partially a sectional view of a working member suspended to the frame in accordance with the invention, FIG. 5 is a detailed sectional view of the hinge in the frame in accordance with the invention, FIG. 6 is perspective front view of the frame in accordance with the invention, showing the specific three-point suspension, FIG. 7 is a perspective detailed elevational view of the hinge structure between the frame and the swath board support.

Referring to the Figures, reference numeral 1 designates the frame of the implement attached to the tractor 2, only the rear wheel and the three-point lift 3 with the power take-off shaft 4 of which are shown. To the frame 1 are suspended two rake wheels 4, which are driven via the gear boxes 5 and an auxiliary shaft 6 by the power take-off shaft 3 about an inclined shaft 7, fastened to the frame 1.

Figure 2:
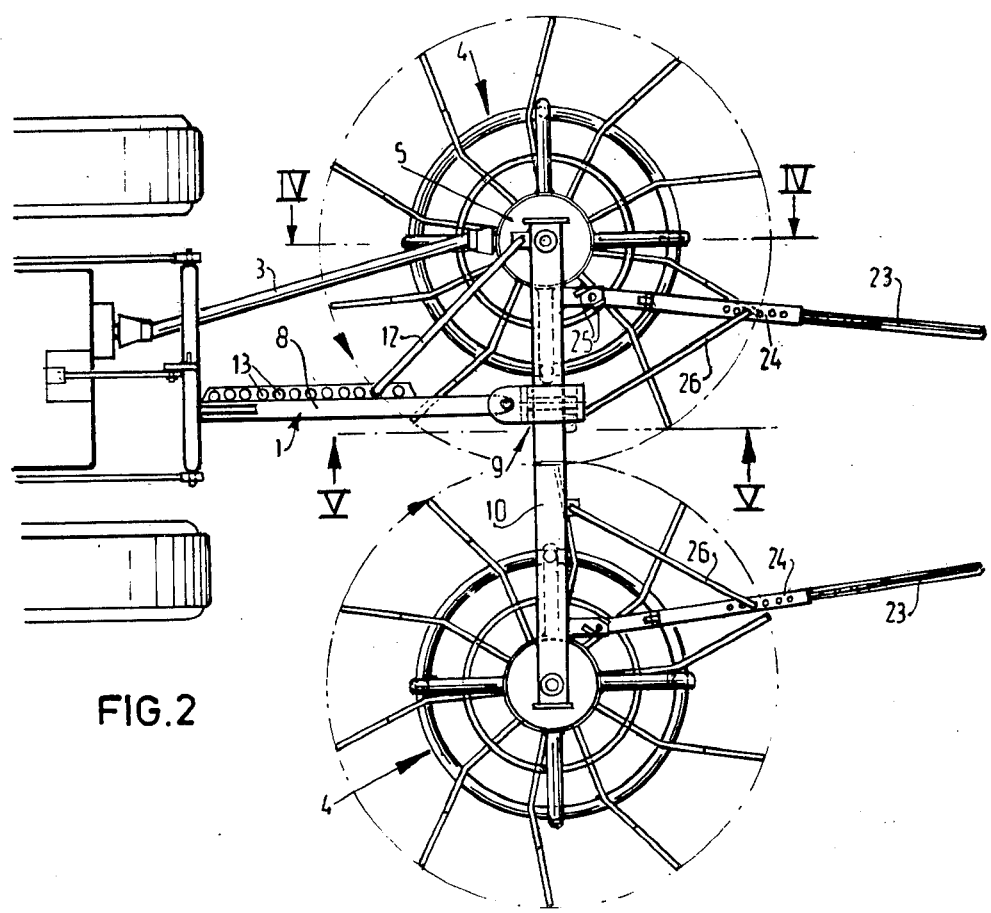

According to the invention the frame 1 comprises a longitudingal beam 8, extending in the direction of movement, and a transverse beam 10 pivoted by a hinge 9 to the end of the longitudinal beam remote from the tractor (see FIGS. 2 and 3). The hinge 9 is coupled in the embodiment shown by a vertical hinge pin 11 with the end of the longitudinal beam 8 remote from the tractor (FIG. 5) so that the transverse beam 10 can be at different angles to the longitudinal beam 8 (see FIGS. 2 and 3). In order to lock the beams in the angular positions a coupling member formed by a coupling rod 12 is arranged between the two beams 8 and 10. The coupling rod 12 is pivoted at one end to the transverse beam 10, whereas the other end of the coupling rod 12 can be connected with the longitudinal beam 8 at a plurality of points. In the embodiment shown this connection is established by inserting the bent-over end of the coupling rod 12 into one of the holes of a strip 13 welded to the longitudinal beam 8.

The power take-off shaft 3 is telescopically displaceable in order to cover the various distances between the power takeoff shaft of the tractor and the gear box of the topmost rake member of FIG. 2.

According to the invention the hinge 9 is furthermore provided with a hinge pin 14 extending in the longitudinal direction (see FIG. 5), about which the transverse beam 10 can tilt in both directions. Thus one rake wheel can be positioned at a higher level than the other, which permits the rake wheels of matching the unevennesses of the ground.

FIG. 4 shows in detail a rake member formed by a supporting frame 15 mainly of tubular material and a plurality of radially extending tines 16 supported by said frame. The frame 15 is fastened at the top to a crown wheel 17 so that the assembly is rotatable about the upright shaft 7. The drive is performed via a pinion 18 rotated by the power take-off shaft 3 and rolling along the crown wheel 17. The crown wheel 17 and the pinion 18 are accommodated in a gear box 19, which is rigidly secured to the upright shaft 7. On the top side the upright shaft 7 is prolonged as far as into the frame, particularly into the transverse beam 10. Owing to this construction the forces exerted on the rake wheel are transferred directly by the upright shaft 7 to the transverse beam 10. The gear box 19 need only absorb the driving force so that it may be of a comparatively light structure.

At the lower end the upright shaft 7 is provided with a ground wheel which is capable of taking up the direction of movement in a manner not shown. FIG. 6 shows an improved connection of the frame 1 with the three-point lift of the tractor. To this end the longitudinal beam 8 of the frame 1 has secured to its front a trestle 20 having on the lower side two aligned stubs 21 for fastening to the two lower coupling points of the three-point suspension and at the top two stubs 22 spaced apart on a horizontal axis and orientated in the same direction as the stubs 21. The two stubs 22 are intended for the topmost coupling point of the three-point suspension so that only one of the stubs is operative. For one position, for example, the raking position, the user will connect the foremost stub with the coupling rod of the three-point suspension and for the other position, for example the tedding position, the hindmost stub. The advantage of such a structure resides in that there is no need for a subsequent adjustment of the coupling rod with regard to its length, since by said choice the correct position of the upright shaft 7 of FIG. 4 is obtained for the desired working position. It will be obvious that by using the foremost or the hindmost stub 22 the inclined position of the shaft 7 can be varied.

From FIGS. 1 and 2 it will be seen that behind the working members 4 the frame 1 of the agricultural implement has suspended to it a pair of swath boards 23, which are capable of moving towards and away from one another by means of a rod-shaped support 24 with respect to the frame 1, for which purpose a hinge having a vertical hinge pin 25 is arranged between the support 24 and the frame (see FIG. 7). The desired position of the swath board 23 with respect to the transverse beam 10 is obtained by adjusting the coupling rod 26.

It will be obvious that in one position of the implement, that is to say, in the raking position, the swath boards are operative, which means that they are positioned behind the implement so that the raked crop is passed in between the swath boards into a swath. In the other position, the spreading position, the swath boards have to be removed so that they will not hinder the correct operation of the rake wheels. According to the invention a second hinge 27 is provided in the support 24, the hinge pin 28 of which is located above said support so that the support 24 can be tilted up through 180°, the swath boards being thus deposited on the frame 1.

FIG. 7 shows furthermore a detail according to the invention in the form of stops 29 secured to the transverse beam 10 and formed by two spaced, parallel plates, between which the tilted-up part of the support 24 can be received. Thus the tilted-up position of the swath board is locked. The orientation of the stops is such that in the tilted-up position the swath boards are directed towards one another and a minimum width is required and the tilted-up swath boards bring about a minimum of trouble.

What is claimed is:

1. An agricultural implement for raking or spreading crop lying on the ground, comprising in combination:
a frame adapted to be attached to a three-point lift of a tractor, said frame including a longitudinal beam disposed in trailing relation behind the three-point lift and extending in the direction of implement movement, and a transverse beam;
pivot means connecting said transverse beam between its ends to the trailing end of said longitudinal beam for povital movement about a generally vertical axis and for pivotal movement about a generally horizontal axis transverse to the axis of said transverse beam;
locking means connecting said longitudinal and transverse beams for adjustment of said transverse beam between a position perpendicular to the longitudinal beam and a position in which the longitudinal and transverse beams include an acute angle;
a pair of ground-engaging support means connected to said transverse beam, one of which is located to one side of said longitudinal beam and the other of which is located to the other side of said longitudinal beam, for following the ground contours while said transverse beam rocks about said generally horizontal axis;
a pair of rake wheels rotatably suspended below said transverse beam for sweeping through generally horizontal paths, one rake wheel being adjacent one support means and the other being adjacent the other support means; and
drive means drivingly interconnecting said rake wheels for rotation thereof by a tractor power take-off shaft.

2. An agricultural implement as defined in claim 1 including a three-point lift attachment at the forward end of said longitudinal beam, said attachment including a pair of horizontally, transversely spaced stubs adapted to be attached to the lower arms of a three-point lift, and a pair of longitudinally spaced upper stubs adapted selectively to be attached to the upper arm of a three-point lift, the longitudinal spacing between said upper stubs being sufficient to alter the paths swept by said rake wheels from a horizontal plane to a forwardly, downwardly inclined plane.

3. An agricultural implement as defined in claim 2 wherein each support means includes a generally vertical shaft fixed at its upper end to said transverse beam, one rake wheel being rotatably journalled on one such shaft and the other rake wheel being rotatably journalled on the other such shaft; said drive means including a first gear box fixed to and centered on said one shaft, a second gear box fixed to and centered on said other shaft, and a drive shaft extending between said gear boxes below said transverse beam.

4. An agricultural implement as defined in claim 1 wherein each support means includes a generally vertical shaft fixed at its upper end to said transverse beam, one rake wheel being rotatably journalled on one such shaft and the other rake wheel being rotatably journalled on the other such shaft; said drive means including a first gear box fixed to and centered on said one shaft; a second gear box fixed to and centered on said other shaft, and a drive shaft extending between said gear boxes below said transverse beam.

5. An agricultural implement as defined in claim 1 including a pair of swath boards pivotally attached to said transverse beam about substantially vertical axes, one swath board being attached adjacent one end of said transverse beam and the other swath board being attached adjacent the other end of said transverse beam, and further pivot means pivotally mounting each swath board for movement between a trailing position behind said transverse beam and a forwardly tilted storage position overlying said transverse beam.

6. An agricultural implement as defined in claim 5 including stop means for supporting each swath board in its forwardly tilted position.

7. An agricultural implement as defined in claim 6 wherein each stop means comprises a U-shaped support.

8. An agricultural implement as defined in claim 7 wherein said U-shaped supports are angled forwardly and inwardly with respect to each other correspondingly to position said swath boards in their forwardly tilted positions.

9. An agricultural implement as defined in claim 3 including a pair of swath boards pivotally attached to said transverse beam about substantially vertical axes, one swath board being attached adjacent one end of said transverse beam and the other swath board being attached adjacent the other end of said transverse beam, and further pivot means pivotally mounting each swath board for movement between a trailing position behind said transverse beam and a forwardly tilted storage position overlying said transverse beam.

10. An agricultural implement as defined in claim 9 including stop means for supporting each swath board in its forwardly tilted position.

11. An agricultural implement as defined in claim 10 wherein each stop means comprises a U-shaped support.

12. An agricultural implement as defined in claim 11 wherein said U-shaped supports are angled forwardly and inwardly with respect to each other correspondingly to position said swath boards in their forwardly tilted positions.

13. An agricultural implement as defined in claim 4 including a pair of swath boards pivotally attached to said transverse beam about substantially vertical axes, one swath board being attached adjacent one end of said transverse beam and the other swath board being attached adjacent the other end of said transverse beam, and further pivot means pivotally mounting each swath board for movement between a trailing position behind said transverse beam and a forwardly tilted storage position overlying said transverse beam.

14. An agricultural implement as defined in claim 13 including stop means for supporting each swath board in its forwardly tilted position.

15. An agricultural implement as defined in claim 14 wherein each stop means comprises a U-shaped support.

16. An agricultural implement as defined in claim 15 wherein said U-shaped supports are angled forwardly and inwardly with respect to each other correspondingly to position said swath boards in their forwardly tilted positions.

17. An agricultural implement comprising in combination:
a longitudinal beam provided with means at its forward end for attachment to a three-point lift of a tractor;
a transverse beam;
means pivotally connecting said transverse beam between its ends to the rearward end of said longitudinal beam for pivotal adjustment in a generally horizontal plane between a position in which the transverse beam is generally perpendicular to said longitudinal beam and a position in which the two beams include an acute angle said means pivotally connecting includes a pivot pin allowing rocking motion of said transverse beam;
means for maintaining selected adjustments of said transverse beam;
a first generally vertical shaft fixed at its upper end to said transverse beam adjacent one end thereof and a second generally vertical shaft fixed at its upper end to said transverse beam adjacent the other end thereof;
a first ground-engaging wheel carried by the lower end of said first shaft and a second ground-engaging wheel carried by the lower end of said second shaft;
a first generally horizontal rake wheel centered upon and rotatably mounted on said first shaft and a second generally horizontally rake wheel centered upon and rotatably mounted on said second shaft, a first ring gear fixed to said first rake wheel concentric with said first shaft and a second ring gear fixed to said second rake wheel concentric with said second shaft;
a first gear box fixed to said first shaft above said first ring gear and a second gear box fixed to said second shaft above said second ring gear, and drive means interconnecting said ring gears for rotating said rake wheels in opposite relative directions.

* * * * *